US010178516B1

(12) United States Patent
Falvai et al.

(10) Patent No.: US 10,178,516 B1
(45) Date of Patent: Jan. 8, 2019

(54) TIME-ADAPTIVE BREVITY CODE RESPONSE ASSISTANT

(71) Applicant: MOTOROLA SOLUTIONS, INC., Chicago, IL (US)

(72) Inventors: Christopher J. Falvai, Pompano Beach, FL (US); Richard L. Blanchett, Coral Springs, FL (US); Kenneth E. Luippold, Davie, FL (US); Matthew E. Simms, Davie, FL (US); Elizabeth M. Stephens, Pembroke Pine, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/874,795

(22) Filed: Jan. 18, 2018

(51) Int. Cl.
*H04W 4/12* (2009.01)
*H04H 20/59* (2008.01)
*H04L 12/18* (2006.01)
*H04W 4/90* (2018.01)

(52) U.S. Cl.
CPC .............. *H04W 4/12* (2013.01); *H04H 20/59* (2013.01); *H04L 12/1895* (2013.01); *H04W 4/90* (2018.02); *H04M 2242/04* (2013.01)

(58) Field of Classification Search
CPC .......... H04W 4/12; H04W 4/90; H04H 20/59; H04L 12/1895; H04M 2242/04
See application file for complete search history.

(56) References Cited

U.S. PATENT DOCUMENTS

| 4,331,953 A * | 5/1982 | Blevins ................ G08B 25/016 |
| | | 340/12.5 |
| 4,426,733 A | 1/1984 | Brenig |
| 2011/0314104 A1* | 12/2011 | Gray ...................... G06Q 10/10 |
| | | 709/205 |
| 2013/0339019 A1* | 12/2013 | Giancarlo ............... G10L 15/04 |
| | | 704/251 |
| 2015/0111553 A1* | 4/2015 | Efrati .................. H04L 12/1818 |
| | | 455/416 |
| 2015/0207781 A1* | 7/2015 | DeLuca .............. H04L 63/0421 |
| | | 726/26 |
| 2015/0237214 A1* | 8/2015 | Blewett ................. H04M 3/563 |
| | | 379/202.01 |
| 2016/0071399 A1* | 3/2016 | Altman ................... G10L 15/02 |
| | | 340/539.11 |
| 2018/0199179 A1* | 7/2018 | Rauner ................... H04W 4/90 |

\* cited by examiner

*Primary Examiner* — Michael Y Mapa
(74) *Attorney, Agent, or Firm* — Michael Best & Friedrich LLP

(57) ABSTRACT

Methods and systems for providing a time-adaptive notification to public safety personnel when a response to a voice communication including a brevity code is not received. One system includes an electronic computing device configured to monitor a first voice communication received by or transmitted from a first communication device and determine that the first voice communication includes a brevity code having a predetermined meaning. The electronic computing device is further configured to determine a response time based on the predetermined meaning and determine that the response time has elapsed and that a second voice communication has not been transmitted from the first communication device before the response time elapsed. The electronic computing device is further configured to provide a notification on an output device of at least one of the first communication device and a second communication device.

20 Claims, 6 Drawing Sheets

TIME-ADAPTIVE BREVITY CODE RESPONSE ASSISTANT

BACKGROUND OF THE INVENTION

Dispatchers (for example, public safety dispatchers) receive calls, evaluate an incident that is being described by a caller, and formulate a proper response to attempt to help a caller with the incident. When attempting to help the caller, dispatchers often communicate with a third party (for example, a first responder) to request that the third party travel to the location of the incident to assist the caller. For example, the dispatcher communicates with an emergency medical services agency to inform paramedics that an ambulance is needed at a location where a person had a heart attack. To receive calls and communicate with third parties, dispatchers use dispatch consoles that may include various devices including, for example, tablets, laptops, desktop computers, phones (for example, cellular or satellite), and devices with interactive displays.

Many such devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
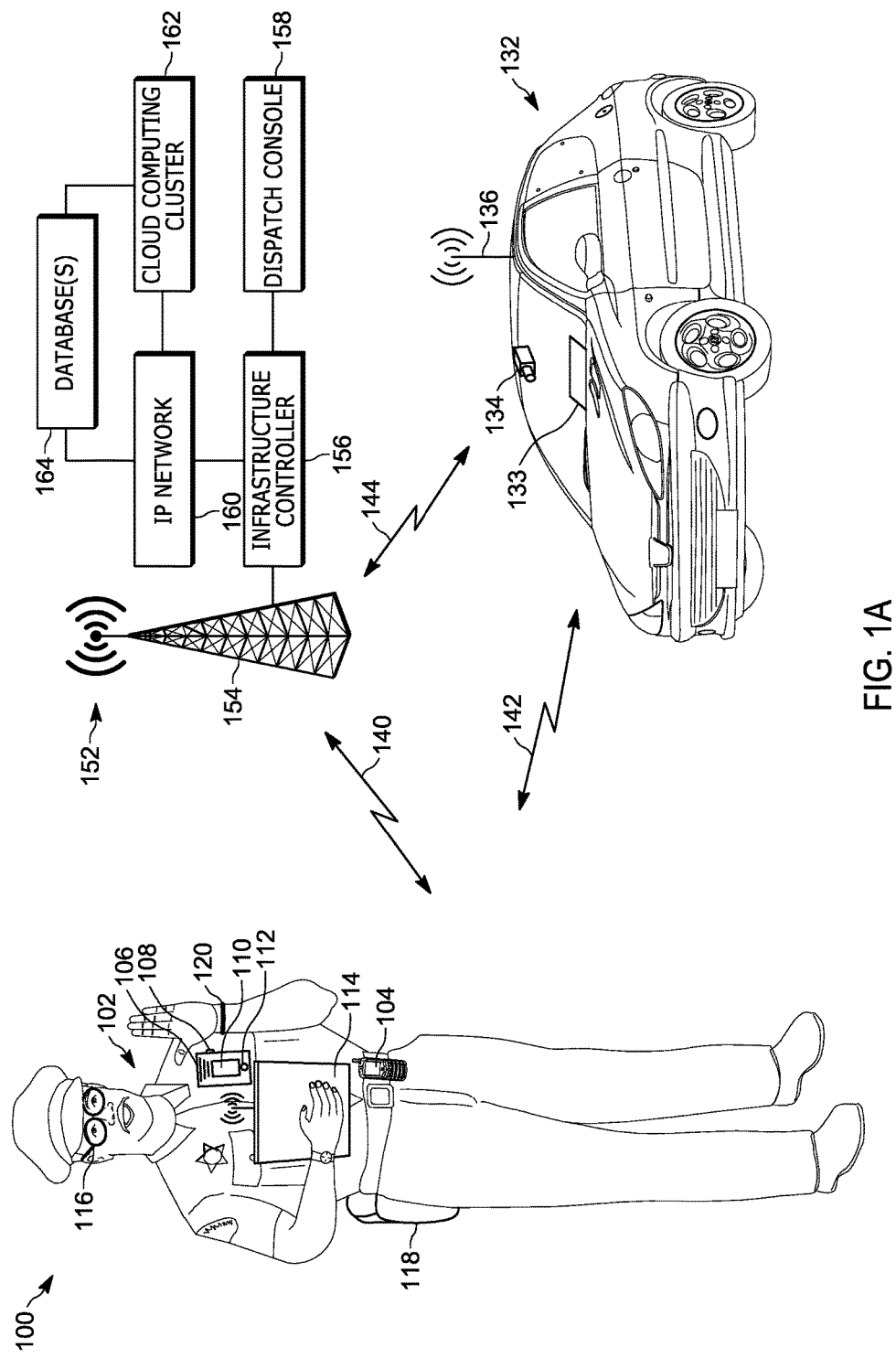
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Dispatchers (for example, public safety dispatchers) and other public safety personnel often communicate with each other using communication devices including, for example, tablets, laptops, desktop computers, phones (for example, cellular or satellite), dispatch consoles, and other devices with interactive displays. Dispatchers and public safety personnel in the field often use brevity codes when communicating with each other to provide statuses such as a status of an incident, a personal status, and the like. For example, public safety personnel use 10-codes such as "10-4" to signal that a message has been received and "10-7" to indicate that an officer is out of service or on break.

In some situations, each dispatcher is tasked with keeping track of individual statuses of a plurality of public safety officers (for example, each public safety officer whose communication device is affiliated with the same talkgroup). When keeping track of the status of each public safety officer, a user interface of a dispatch console being used by the dispatcher may become overwhelmed with information such that the information is difficult to understand. Additionally, the dispatcher may engage in follow-up communication with one or more public safety officers who have not responded to a previous status query or who have not provided an updated status for a relatively long period of time. However, engaging in follow-up communication too often may cause a technical problem by increasing communication traffic and slowing down a network that supports the communication. On the other hand, engaging in follow-up communication too sparingly may prevent the dispatcher from timely recognizing that a public safety officer needs assistance.

To prevent the dispatcher from forgetting to follow up with one or public safety officers, some communication devices are capable of providing reminders at predetermined times after an event has occurred. However, providing reminders at the same predetermined time for different events and situations may further overwhelm or crowd the user interface of the dispatch console without providing the dispatcher an accurate reminder as to whether follow-up communication is appropriate. For example, when reminders are provided too early and too often, the dispatcher may ignore the reminders. Additionally, providing reminders too often on the user interface may cause a technical problem by using unnecessary processing capabilities of the dispatch console and slowing down the execution of other applications on the dispatch console.

Among other things, disclosed are a method, device, and system for an electronic digital assistant to provide a time-adaptive notification to public safety personnel when a response to a voice communication including a brevity code is not received. The electronic digital assistant recognizes a brevity code included in a first voice communication and provides a notification in response to determining that a determined response time has elapsed without receiving a second voice communication in response to the first voice communication. As explained in greater detail below, the disclosed method, device, and system solve the technical problem of increased communication traffic and decreased network performance that may occur when dispatchers engage in follow-up communication too often. The disclosed method, device, and system also may prevent the dispatcher from engaging in follow-up communication too sparingly. Additionally, the disclosed method, device, and system solve the technical problem of the communication device of the dispatcher using unnecessary processing capabilities by providing reminders on the user interface too often. Along similar lines, the disclosed method, device, and system may reduce the amount of information provided on the user interface of the communication device of the dispatcher to allow the dispatcher to better understand the information.

One embodiment provides an electronic computing device that includes a transceiver and an electronic processor communicatively coupled to the transceiver. The electronic processor is configured to monitor a first voice communication received by or transmitted from a first communication device and determine that the first voice communication includes a brevity code having a predetermined meaning. The electronic processor is further configured to determine a response time based on the predetermined meaning. The electronic processor is further configured to determine that the response time has elapsed and that a second voice communication has not been transmitted from the first communication device before the response time elapsed. The electronic processor is further configured to provide a notification on an output device of at least one of the first communication device and a second communication device in response to determining that the response time has elapsed without the second voice communication being transmitted from the first communication device.

Another embodiment provides a method of providing a time-adaptive notification to public safety personnel when a response to a voice communication including a brevity code is not received. The method includes monitoring, with an electronic computing device, a first voice communication received by or transmitted from a first communication device. The method further includes determining, with the electronic computing device, that the first voice communication includes a brevity code having a predetermined meaning. The method further includes determining, with the electronic computing device, a response time based on the predetermined meaning. The method further includes determining, with the electronic computing device, that the response time has elapsed and that a second voice communication has not been transmitted from the first communication device before the response time elapsed. The method further includes providing, with the electronic computing device, a notification on an output device of at least one of the first communication device and a second communication device in response to determining that the response time has elapsed without the second voice communication being transmitted from the first communication device.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
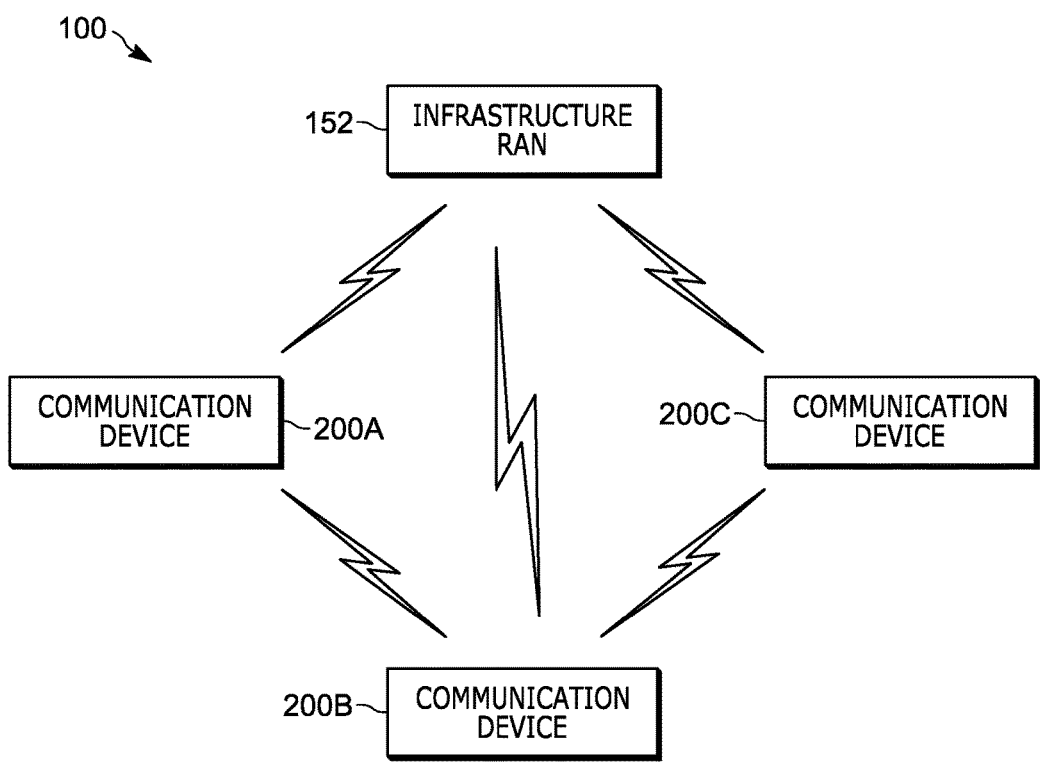

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B. In some embodiments, the system 100 includes one or more tablets, interactive whiteboards, and/or other interactive displays that include an input device that is sensitive to contact from, for example, a stylus or a user's finger (and that may be referred to as a touch sensitive display). In some embodiments, one or both of the portable radio 104 and the laptop 114 include a touch sensitive display.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers. In some embodiments, the vehicle 132 includes one or more communication devices that include a touch sensitive display (for example, the mobile communication device 133).

Each of the portable radio 104, RSM video capture device 106, laptop 114, vehicular mobile communication device 133, and other devices may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The RAN 152 may be a wired or wireless communication network. All or parts of the RAN 152 may be implemented using various existing networks, for example, a land mobile radio (LMR) network, a Long Term Evolution (LTE) network, a Bluetooth™ network, a wireless local area network (for example, Wi-Fi), a Machine-to-machine (M2M) autonomous network, and a public switched telephone network. The RAN 152 may also include future developed networks. In some embodiments, the RAN 152 also includes a combination of the networks mentioned previously herein.

In the example of FIG. 1A, the portable radio 104 forms the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 contains a short-range transmitter and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 contain their own long-range transceivers and communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 is provided for displaying images, video, and/or text to the user 102 or to someone else. The display screen 110 is, for example, a liquid crystal display (LCD) screen or an organic light emitting display (OLED) display screen. In some embodiments, a touch sensitive input interface is incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone is used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 is replaced with a more limited body worn camera that includes the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen is, for example, an LCD screen or an OLED display screen. In some embodiments, a touch sensitive input interface is incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 include its own long-range transceiver and communicate with other communication devices and/or with the infrastructure RAN 152 or vehicular transceiver 136 directly without passing through portable radio 104.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 also detects whether the first responder's hand is resting on the weapon even if it has not yet been removed from the holster and provide such information to portable radio 104. In some embodiments, a weapon of the user 102 includes a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 includes its own long-range transceiver and communicates with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor monitors a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1A as a bracelet worn around the wrist, in other examples, the biometric sensor wristband 120 is additionally and/or alternatively worn around another part of the body, or takes a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further communicate between the mobile communication device 133 and/or the vehicular video camera 134 in the VAN. The mobile communication device 133 may include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above is disposed, and similarly communicates with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN provides infrastructure communications to the other, depending on the situation and the types of devices in the VAN and/or PAN and provides interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A is equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

The system of FIG. 1A includes a dispatch console 158 operated by a dispatcher. The dispatch console 158 may include one or more of the devices described above with respect to the user 102. For example, the dispatch console 158 includes a laptop 114 or another computer with input devices and a display. In some embodiments, the dispatch console 158 includes a portable radio 104 or a stationary radio that functions similarly to the portable radio 104. In some embodiments, the dispatch console 158 is coupled to a telephone line to allow the dispatcher to receive calls from public citizens. In some embodiments, the dispatch console 158 includes a headset coupled to the portable radio 104 or stationary radio. The headset may be worn by the dispatcher to allow the dispatcher to communicate with callers and public safety officers in a hands-free manner that allows the dispatcher to simultaneously operate the laptop 114 or another computer during a call. Other possibilities for devices included in the dispatch console 158 are possible. While the dispatch console 158 was described above with reference to a single dispatcher, in some embodiments, the dispatch console 158 is located at a dispatch center that includes a plurality of dispatch consoles 158 that are each operated by one or more dispatchers.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by the dispatcher. In other embodiments, additional fixed terminals and additional controllers are disposed to support a larger geographic footprint and/or a larger number of mobile devices. In some embodiments, a middleware server that translates between a narrowband system and a broadband system is disposed in infrastructure RAN 152 at infrastructure controller 156 or at a separate cloud computing cluster 162 communicably coupled to infrastructure controller 156 via internet protocol (IP) network 160, among other possibilities.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 are maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, the mobile communication device 133, and the dispatch console 158) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 is additionally or alternatively a retail communication system including a user 102 that is an employee of a retailer and a vehicle 132 that is a vehicle for use by the user 102 in furtherance of the employee's retail duties (for example, a shuttle or self-balancing scooter). In other embodiments, the communication system 100 is additionally or alternatively a warehouse communication system including a user 102 that is an employee of a warehouse and a vehicle 132 that is a vehicle for use by the user 102 in furtherance of the employee's retail duties (for example, a forklift). In still further embodiments, the communication system 100 is additionally or alternatively a private security communication system including a user 102 that is an employee of a private security company and a vehicle 132 that is a vehicle for use by the user 102 in furtherance of the private security employee's duties (for example, a private security vehicle or motorcycle). In even further embodiments, the communication system 100 is additionally or alternatively a medical communication system including a user 102 that is a doctor or nurse of a hospital and a vehicle 132 that is a vehicle for use by the user 102 in furtherance of the doctor or nurse's duties (for example, a medical gurney or ambulance). In still another example embodiment, the communication system 100 is additionally or alternatively a heavy machinery communication system including a user 102 that is a miner, driller, or extractor at a mine, oil field, or precious metal or gem field and a vehicle 132 that is a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. In some embodiments, one or more users have multiple associated communication devices 200, for example, as shown in FIG. 1A. In some embodiments, the dispatch console 158 (which also may be referred to as a communication device 200) directly communicates with other communication devices 200 of multiple users through the infrastructure RAN 152. For example, the dispatch console 158 communicates with one or more of the portable radio 104, the RSM video capture device 106, the laptop 114, the smart glasses 116, and/or the vehicle transceiver 136. In some embodiments, the dispatch console 158 also communicates with the cloud computing cluster 162, and the database(s) 164. In some embodiments, the dispatch console 158 communicates with another dispatch console 158. For example, the dispatch console 158 is located within a first dispatch center (for example, a county-wide or state-wide general dispatch center) and communicates with another dispatch console 158 located at a second dispatch center (for example, a police station of city, a fire station of a city or predefined geographical area within the city, and the like). In other words, in some embodiments, the dispatch console 158 communicates with a public safety command center.

b. Device Structure

Figure 2:
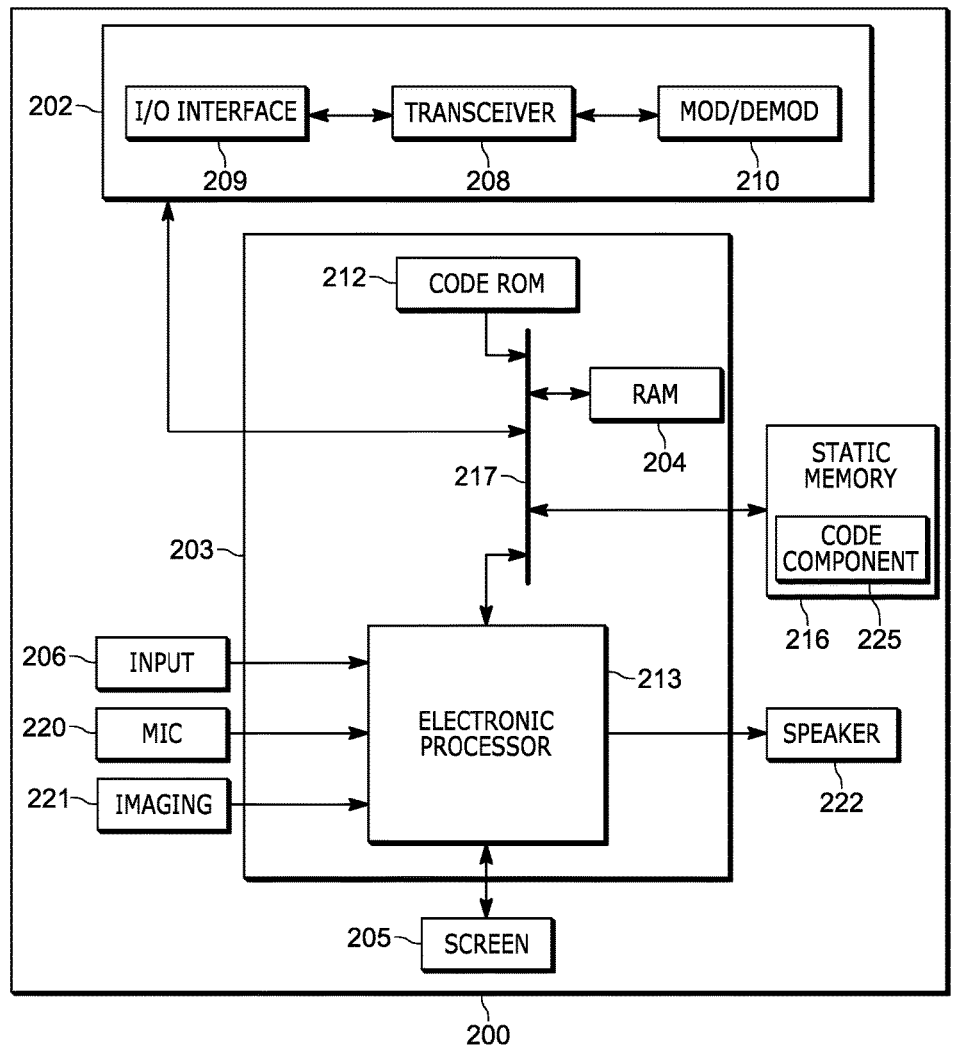
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 is, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or is a distributed communication device across two or more of the foregoing (or multiple of a same type of one of the foregoing) and linked via a wired and/or wireless communication link(s). In some embodiments, the communication device 200 (for example, the portable radio 104) is communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, the communication device 200 acting as the infrastructure controller 156 may not include one or more of the screen 205, microphone 220, imaging device 221, and speaker 222. As another example, in some embodiments, the communication device 200 acting as the portable radio 104 or the RSM video capture device 106 further includes a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, a keypad, pointing device, a button, a microphone 220, an imaging device 221, and/or another input device 206), each coupled to be in communication with the processing unit 203. In some instances, one or more communication devices 200 include a screen 205 that, in some embodiments, is a touch sensitive screen and thus also acts as an input device.

Figure 3:
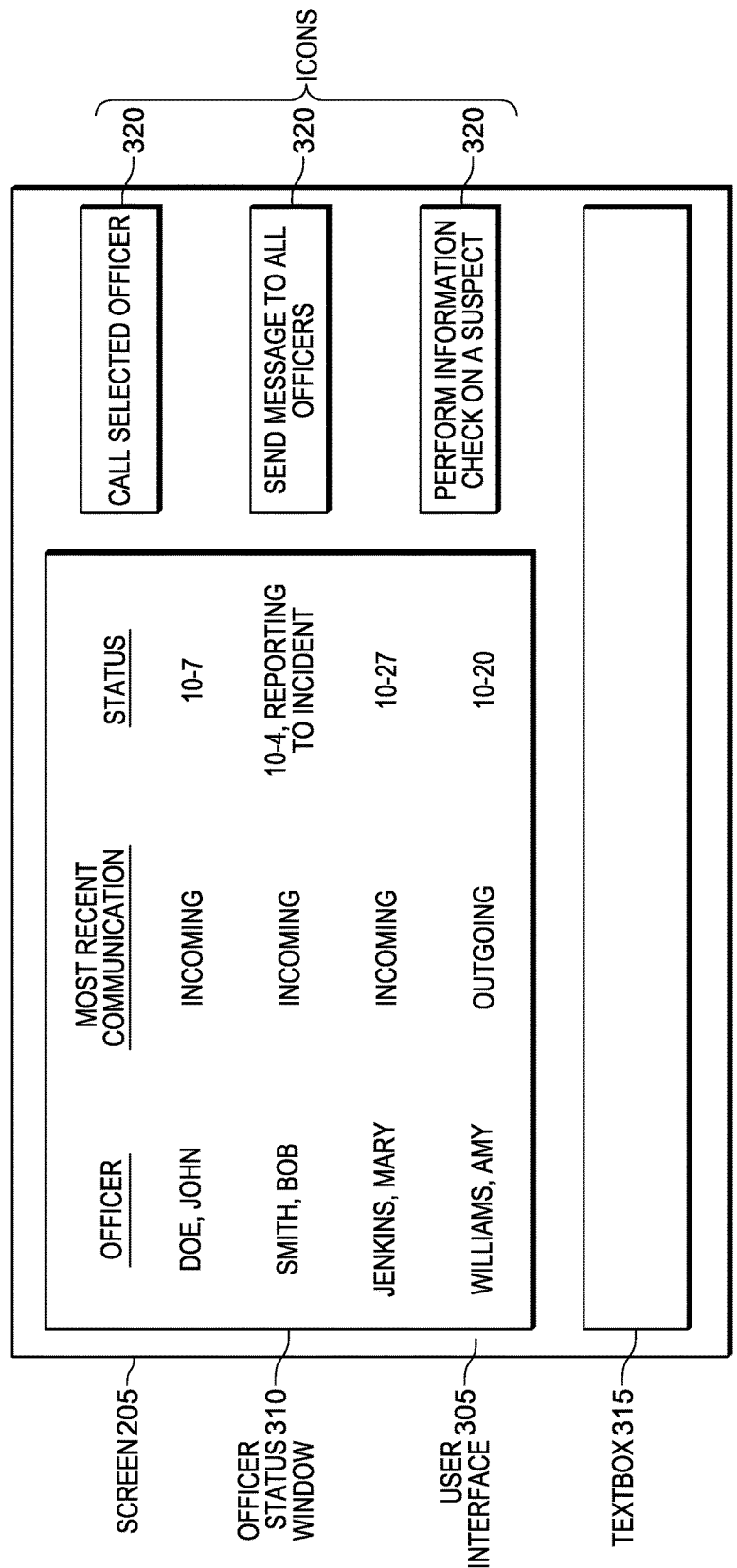
FIG. 3 illustrates an example user interface displayed on a screen of a dispatch console in accordance with some embodiments.

In some embodiments, a communication device 200 embodied by the dispatch console 158 displays a user interface on the screen 205 that includes information relating to a status of each of a plurality of public safety officers (for example, each public safety officer whose communication device 200 is affiliated with the same talkgroup). FIG. 3 illustrates an example user interface 305 displayed on the screen 205 of the dispatch console 158 in accordance with some embodiments. In the embodiment shown, the user interface 305 includes an officer status window 310 that displays the status of each of a plurality of public safety officers and whether the most recent communication between each public safety officer and the dispatcher was incoming from the public safety officer or outgoing from the dispatcher. The user interface 305 shown in FIG. 3 also includes a textbox 315 that displays information entered by the dispatcher via a keyboard, for example. The user interface 305 also includes icons 320 that, when selected via a user input on the dispatch console 158, cause the dispatch console 158 to perform actions such as calling a selected public safety officer, sending a message to all public safety officers, and performing an information check on a suspect (for example, a driver's license check, an arrests/warrants check, and the like).

The icons 320 shown in FIG. 3 are examples, and in other embodiments, the icons 320 are labeled differently and, when selected via a user input on the dispatch console 158, cause the dispatch console 158 to perform other actions than those listed above. As mentioned above, in some embodiments, the screen 205 is a touch screen that receives user input from the dispatcher to select items on the user interface 305. In other embodiments, the dispatch console 158 includes a user input device such as a keyboard and mouse that allows the dispatch console 158 to receive user input from the dispatcher to select items on the user interface 305. The user interface 305 shown in FIG. 3 is an example, and in other embodiments, the user interface 305 includes more or less windows, textboxes, and icons arranged differently than as shown in FIG. 3. Similarly, in other embodiments, the officer status window 310 includes more or less information than the three columns of information shown in FIG. 3.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. For example, the microphone 220 of at least one of the dispatch console 158 and a communication device 200 of a public safety officer captures audio corresponding to communication between a dispatcher and the public safety officer as will be described in greater detail below. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other communication devices 200 of public safety officers, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include the electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as a the portable radio 104, the laptop 114, the wireless RAN 152, the mobile communication device 133, the remote cloud computing cluster 162, the databases 164, and other dispatch consoles 158.

For example, the communications unit 202 includes one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. In some embodiments, the static memory 216 stores public safety agency rules related to brevity code response times and historical information relating to brevity code response times of at least one of a public safety officer and a public safety fleet as will be described in greater detail below. The static memory 216 comprises, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Providing a Time-Adaptive Notification to Public Safety Personnel when a Response to a Voice Communication Including a Brevity Code is not Received In some embodiments, an individual component and/or a combination of individual components of the system 100 is referred to as an electronic computing device that implements an electronic digital assistant as mentioned above. For example, the electronic computing device is a single electronic processor (for example, the electronic processor 213 of a dispatch console 158). In other embodiments, the electronic computing device includes multiple electronic processors distributed remotely from each other. For example, the electronic computing device is implemented on a combination of at least two of the electronic processor 213 of the dispatch console 158, the electronic processor 213 of a communication device 200 of a public safety officer in the field, the electronic processor 213 of the infrastructure controller 156, and the electronic processor 213 of a back-end device in the cloud computing cluster 162 accessible via the IP network 160.

As one way to use the electronic digital assistant implemented by the electronic computing device, the microphone 220 of at least one of the dispatch console 158 and a communication device 200 of a public safety officer monitors communication between a dispatcher and the public safety officer. The electronic computing device receives audio signals representative of the communication between the dispatcher and the public safety officer from the microphone 220 and analyzes the audio signals to determine whether the communication includes a brevity code (for example, a 10-code, a Q-code, or the like). For example, the electronic computing device includes a natural language processing (NLP) engine configured to recognize that a brevity code has been spoken by at least one of the dispatcher and the public safety officer (for example, by analyzing audio data and/or a text transcription of audio data). In other words, one or more of the communication devices 200, embodied in one or more of the communication devices of FIG. 1A, such as the dispatch console 158, a communication device 200 of a public safety officer in the field, the infrastructure controller 156, and/or the cloud computing cluster 162 includes a natural language processing engine to analyze communication monitored by the microphone 220 of at least one of the dispatch console 158 and a communication device 200 of a public safety officer and provide information or assistance to the dispatcher.

Although monitoring of oral communication is described above, in some embodiments, the electronic computing device receives and responds to other types of inputs. For example, the dispatcher inputs metadata into the electronic computing device during a call by typing text into a hard keyboard input device or a soft keyboard input provided on the screen 205 of the dispatch console 158. For example, the dispatcher enters the status of a public safety officer, the location of the public safety officer, details of an incident that the public safety officer is handling, and the like. The electronic computing device uses this metadata to, for example, determine a response time for the public safety officer to respond to a first voice communication as explained in greater detail below.

As mentioned above, when a dispatcher is keeping track of the status of each of a plurality of public safety officers, a user interface of the dispatch console 158 may become overwhelmed with information such that the information is difficult to understand. Additionally, the dispatcher may engage in follow-up communication with one or more public safety officers too often which may cause a technical problem by increasing communication traffic and slowing down a network that supports the communication. On the other hand, the dispatcher may engage in follow-up communication too sparingly which may prevent the dispatcher from timely recognizing that a public safety officer needs assistance. Also as mentioned above, providing reminders at the same predetermined time for different events and situations may further crowd the user interface of the dispatch console 158. Similarly, providing reminders too often on the user interface may cause a technical problem by using unnecessary processing capabilities of the dispatch console 158 and slowing down the execution of other applications on the dispatch console 158.

Figure 4:
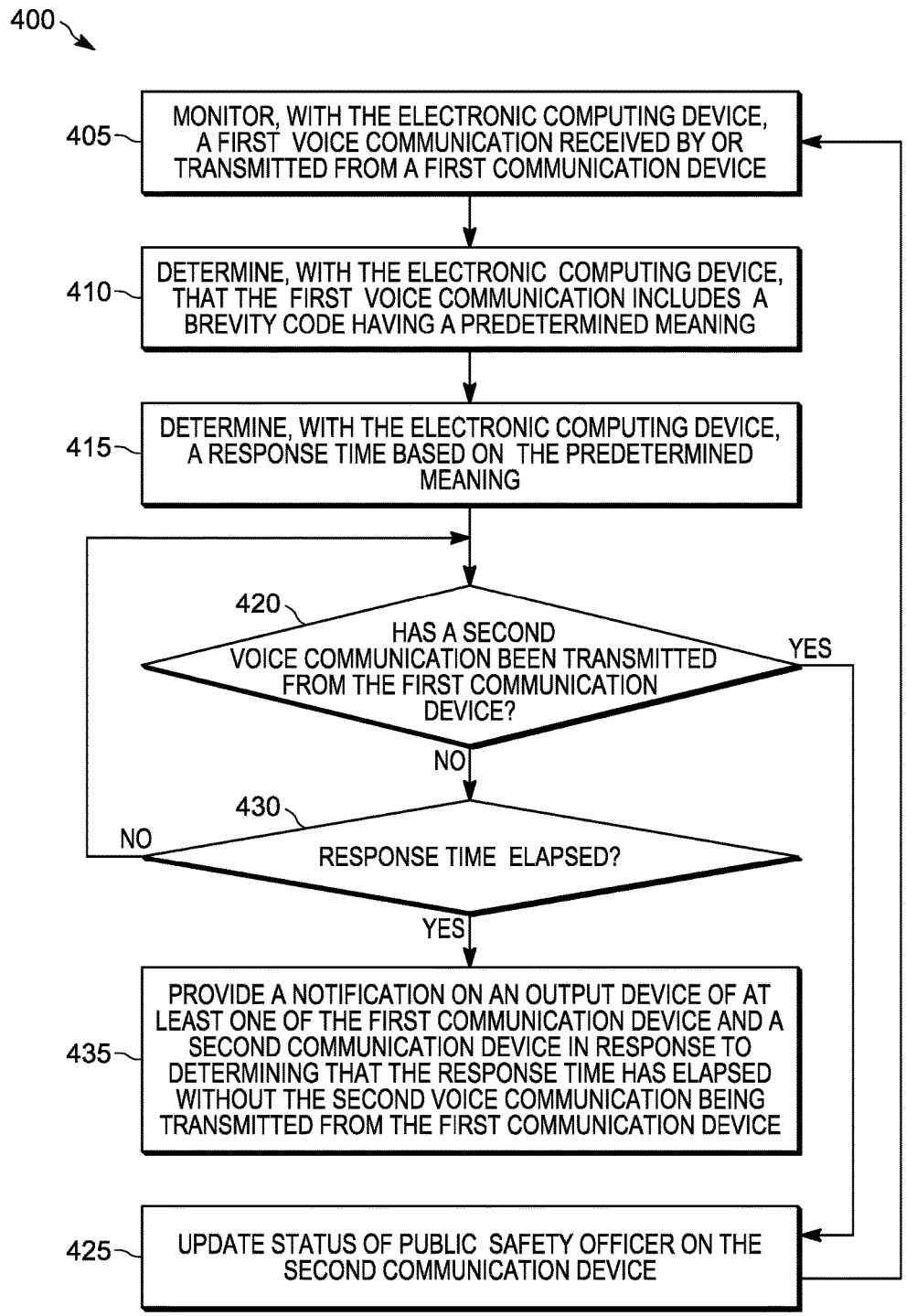
FIG. 4 illustrates a flow chart of a method of providing a time-adaptive notification to public safety personnel when a response to a voice communication including a brevity code is not received in accordance with some embodiments.

To avoid and solve these problems, in one embodiment the electronic computing device that implements the electronic digital assistant performs a method 400 illustrated in FIG. 4 to provide a time-adaptive notification to public safety personnel when a response to a voice communication including a brevity code is not received. Among other things, the method 400 provides a technical solution to a technical problem by reducing communication traffic caused by follow-up communication occurring too often. Thus, the network on which communication is occurring may run more efficiently. Additionally, the method 400 provides a technical solution to a technical problem by preventing the dispatch console 158 from using unnecessary processing capabilities to provide follow-up reminders to the dispatcher too often. Thus, the dispatch console 158 may run more efficiently. The method 400 may also prevent the dispatcher from engaging in follow-up communication too sparingly and may reduce the amount of information provided on the user interface of the dispatch console 158 to allow the dispatcher to better understand the information.

FIG. 4 illustrates a flow chart diagram of the method 400 performed by the electronic computing device for providing a time-adaptive notification to public safety personnel when a response to a voice communication including a brevity code is not received. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. Additionally, while the method 400 is described below with respect to the user interface 305 of the dispatch console 158, in some embodiments, the method 400 is executed to control a user interface on a different communication device 200 (for example, a portable communication device 200 of a commander in the field). In other words, the second communication device described below as the dispatch console 158 may be a different communication device 200.

At block 405, the electronic computing device monitors a first voice communication received by or transmitted from a first communication device 200. In some embodiments, the first communication device 200 is associated with a public safety officer in the field. In other words, the public safety officer is on patrol, handling an incident, or performing a similar action in the interest of public safety. In some situations, the first voice communication is transmitted from the first communication device 200 and is intended for a second communication device 200 (for example, the dispatch console 158). For example, the first voice communication indicates that the public safety officer is requesting backup or going on break. In other situations, the first voice communication is received by the first communication device 200 from the dispatch console 158. For example, the first voice communication indicates that the dispatcher is requesting a health status of the public safety officer or is providing information to the public safety officer regarding a criminal or incident.

At block 410, the electronic computing device determines that the first voice communication includes a brevity code (for example, a 10-code, a Q-code, and the like) having a predetermined meaning (for example, using the natural language processing engine as explained above). For example, some brevity codes provide statuses such as a status of an incident, a personal status, and the like. For example, public safety personnel use 10-codes such as "10-4" to signal that a message has been received and "10-7" to indicate that an officer is out of service or on break. In some embodiments, the electronic computing device updates a status of the public safety officer associated with the first communication device 200 based on the brevity code on a user interface of the second communication device 200. For example, as shown in FIG. 3, the electronic computing device displays the brevity code in the officer status window 310 along with an indication of whether the most recent communication was incoming from the first communication device 200 to the dispatch console 158 or outgoing from the dispatch console 158 to the first communication device 200. Also as shown in FIG. 3, the statuses may include information in addition to the brevity code. For example, the status of Officer Bob Smith indicates that he is reporting to an incident. This additional information is received via a user input of the dispatch console 158 (for example, typed via a keyboard into the textbox 315) or is recognized by the natural language processing engine of the electronic computing device (for example, by analyzing audio data and/or a text transcription of audio data of the voice communication between the dispatcher and the public safety officer).

At block 415, the electronic computing device determines a response time based on the predetermined meaning of the brevity code included in the first voice communication. In some embodiments, the electronic computing device retrieves the predetermined meaning of the brevity code from one of the database 164 or a memory on a communication device 200 (for example, a memory of the dispatch console 158, a memory of the first communication device 200, or a memory of the infrastructure controller 156). For example, the electronic computing device retrieves the predetermined meaning of the brevity code from a stored look-up table of brevity codes and corresponding predetermined meanings. The electronic computing device then uses the predetermined meaning to determine the response time. For example, for a 10-7 brevity code with a predetermined meaning that the public safety officer is out of service, the electronic computing device determines that the response time is fifteen minutes. However, for a 10-20 brevity code that inquires about the location of the public safety officer, the electronic computing device determines that the response time is two minutes. As demonstrated by the two above examples, the electronic computing device determines different response times for different brevity codes based on the different predetermined meanings of each brevity code.

In some embodiments, the electronic computing device determines or adjusts the response time based on at least one of a number of additional factors. In some embodiments, these additional factors include at least one of a fleet tendency of responding to the brevity code, an officer tendency of responding to the brevity code, an agency rule, an officer involvement in an incident, a location of the first communication device 200, a traffic condition, an environmental condition, and data from a sensor of the first communication device 200 of the public safety officer. In some embodiments, the electronic computing device retrieves information corresponding to the additional factors from one of the database 164 or a memory on a communication device 200 (for example, a memory of the dispatch console 158, a memory of the first communication device 200, or a memory of the infrastructure controller 156). In some embodiments, the additional factors used to determine or adjust the response time carry the same weight. In other embodiments, the additional factors carry different weight. In some embodiments, the additional factors used and the weight given to each additional factor is configurable by a public safety agency via a user input. For example, a public safety agency may choose to have the electronic computing device exclude some of the additional factors from consideration when determining the response time. Examples of how the electronic computing device determines or adjusts the response time based on the additional factors are provided below.

In some embodiments, the fleet tendency of responding to the brevity code is an average amount of time that it has taken public safety officers within a particular public safety agency and/or jurisdiction to respond to a particular brevity code. In other words, the electronic computing device stores response times for each officer of a fleet of officers responding to each brevity code to create a historical log of response times that may be used to determine the response time when the brevity code is later communicated. The electronic computing device may then use the historical log of response times for a particular brevity code to determine an average response time for the officers within the agency. In some embodiments, the electronic computing device uses the average response time as the response time determined at block 415. Accordingly, the electronic computing device may adaptively adjust the response time for a particular brevity code based on historical response times of the fleet (in other words, fleet tendency of responding to the brevity code).

Similarly, in some embodiments, the officer tendency of responding to the brevity code is an average amount of time that it has taken a particular public safety officer to respond to the brevity code. In other words, the electronic computing device stores response times for the particular officer responding to each brevity code to create a historical log of response times that may be used to determine the response time when the brevity code is later communicated to or from the particular officer. The electronic computing device may then use the historical log of response times for a particular brevity code and the particular officer to determine an average response time for particular officer. In some embodiments, the electronic computing device uses the average response time as the response time determined at block 415. Accordingly, the electronic computing device may adaptively adjust the response time for a particular brevity code based on historical response times of the particular officer to the particular brevity code.

In some embodiments, the agency rule is an amount of time defined by a particular public safety agency that corresponds to when a public safety officer needs to respond to a particular brevity code. For example, a police station in County A has an agency rule that police officers are allowed to take a fifteen minute break while a police station in County B has an agency rule that police officers are allowed to take a ten minute break. In this example, the electronic computing device is configured to account for the agency rule of each police station accordingly such that the response time is different for officers of each police station with respect to the brevity code 10-7 indicating that an officer has gone on break. Other agency rules that define an amount of time in which an officer should respond to a communication may be set with respect to other brevity codes.

In some embodiments, the predetermined meaning of the brevity code indicates officer involvement in an incident. For example, the brevity code 10-32 indicates that the public safety officer is handling an incident where a person has a gun. Based on the predetermined meaning indicating that the officer is involved in an incident, the electronic computing device determines the response time accordingly. For example, in some situations, the electronic computing device increases the response time (from an average response time, for example) to give the public safety officer more time to respond. In other situations, the electronic computing device decreases the response time to indicate to the dispatcher to follow-up with the public safety officer more quickly.

In some embodiments, the electronic computing device determines the response time based on the location of the first communication device 200. The electronic computing device determines the location of the first communication device 200 by receiving information from the location determination device of the first communication device 200. Alternatively, the electronic computing device receives user input via the dispatch console 158 that indicates the location of the first communication device 200. As an example of determining the response time based on the location of the first communication device 200, the electronic computing device increases the response time (from an average response time, for example) when the first communication device 200 is located in an area known to have poor network connectivity (for example, in a tunnel). As another example, the electronic computing device determines that the public safety officer is handling an incident based on the location of the first communication device 200 corresponding to a known location of the incident. Accordingly, the electronic computing device may determine the response time as described above with respect to officer involvement in an incident.

In some embodiments, the electronic computing device determines the response time based on a traffic condition or an environmental condition. The electronic computing device may determine a traffic condition or an environmental condition being experienced by a public safety officer by utilizing the location of the first communication device 200. For example, the electronic computing device determines the traffic condition (for example, high traffic congestion, low traffic congestion, and the like) and/or the environmental condition (for example, temperature, precipitation, visibility, and the like) of the location of the first communication device 200 by retrieving information from the database 164. Based on the traffic condition and/or the environmental condition, the electronic computing device determines the response time. For example, when there is high traffic congestion and low visibility, the electronic computing device increases the response time (from an average response time, for example) to give the public safety officer more time to respond.

In some embodiments, the electronic computing device determines the response time based on data from a sensor of the first communication device 200 (for example, a sensor of at least one of the sensor-enabled holster 118 and a biometric sensor wristband 120). In some embodiments, data from a sensor of the first communication device 200 indicates a context of the public safety officer. For example, when the sensor-enabled holster 118 indicates that a gun has been removed, the public safety officer may be engaged in a high stress situation. In such a situation, the electronic computing device increases the response time (from an average response time, for example) to give the public safety officer more time to respond (for example, after the high stress situation has ended). As another example, when a heart rate sensor of the biometric sensor wristband 120 indicates an abnormality (for example, that the officer is not breathing), the electronic computing device decreases the response time to indicate to the dispatcher to follow-up with the public safety officer more quickly.

In some embodiments, the electronic computing device determines or adjusts the response time based on a combination of two or more of the previously explained additional factors including, for example, a fleet tendency of responding to the brevity code, an officer tendency of responding to the brevity code, an agency rule, an officer involvement in an incident, a location of the first communication device 200, a traffic condition, an environmental condition, and data from a sensor of the first communication device 200 of the public safety officer.

After determining the response time (at block 415), at block 420, the electronic computing device determines whether a second voice communication has been transmitted from the first communication device 200. In other words, the electronic computing device determines whether the public safety officer has responded to the first voice communication.

When a second voice communication has been transmitted from the first communication device 200, at block 425, the electronic computing device updates a status of the public safety officer on the second communication device 200 (in other words, on the user interface 305 of the dispatch console 158). For example, with reference to FIG. 3, the electronic computing device updates the status column of the public safety officer in the officer status window 310 based on the second voice communication. In some situations, the electronic computing device displays a brevity code that was included in the second voice communication as the status of the public safety officer. After updating the status of the public safety officer on the user interface 305 of the dispatch console 158, the method 400 proceeds back to block 405. In fact, in some embodiments, the electronic computing device re-executes the method 400 with respect to the second voice communication.

Returning to block 420, when a second voice communication has not been transmitted from the first communication device 200, at block 430, the electronic computing device determines whether the response time has elapsed. For example, the electronic computing device starts a timer when the first voice communication is received by or transmitted from the first communication device 200. The electronic computing device then compares a value of the timer to the response time to determine whether the response time has elapsed. When the response time has not elapsed, the method 400 proceeds back to block 420 to determine whether a second voice communication has been transmitted from the first communication device 200. In other words, the electronic computing device repeats blocks 420 and 430 until either a second voice communication is transmitted from the first communication device 200 or the response time elapses.

In response to determining that the response time has elapsed without the second voice communication being transmitted from the first communication device 200, at block 435, the electronic computing device provides a notification on an output device of at least one of the first communication device 200 of the public safety officer and a second communication device 200. In some embodiments, the second communication device 200 is embodied by the dispatch console 158. However, as noted above, the second communication device 200 may be another communication device 200 (for example, a portable communication device 200 of a commander in the field).

In some embodiments, the notification is at least one of a visual notification output on a screen (for example, the screen 205 of the dispatch console 158 or the first communication device 200) and an audible notification output by a speaker (for example, the speaker 222 of the first communication device 200). As an example of the audible notification, the electronic computing device controls the speaker 222 of the first communication device 200 to repeat the brevity code that was not responded to or to provide some other audible reminder for the public safety officer to respond to the first voice communication. As an example of the visual notification, the visual notification on the screen 205 of the dispatch console 158 is provided on the user interface 305 of FIG. 3 to alert the dispatcher to engage in follow-up communication with the public safety officer associated with the first communication device 200. In some embodiments, the electronic computing device highlights the particular officer's information red in the officer status window 310 to provide the visual notification. In other embodiments, the electronic computing device changes the font or size of the font of the particular officer's information in the officer status window 310 to provide the visual notification. In other embodiments, the officer status window 310 includes an additional column where icons are displayed to provide visual notifications to the dispatcher.

In some embodiments, the electronic computing device changes an order in which the officers are listed in the officer status window 310. For example, as shown in FIG. 3, the officer status window 310 of the user interface 305 includes a plurality of statuses that each corresponds to a public safety officer associated with a respective first communication device 200. In some embodiments, each status is based on a respective brevity code received by or transmitted from each of the respective first communication devices 200 as explained above. In some embodiments, the electronic computing device displays an updated user interface on the screen 205 of the dispatch console 158 that prioritizes the plurality of statuses based on at least one of the respective brevity code and an amount of time that has elapsed since a respective voice communication that included the respective brevity code has been received by or transmitted from the respective first communication device 200.

For example, the electronic computing device highlights officer information green in the officer status window 310 when the respective response time for the most recent communication with the officer has not yet elapsed. When the respective response time for the most recent communication with an officer has elapsed without a voice communication response being transmitted from the first communication device 200 of the officer, the electronic computing device may highlight the officer information yellow to provide a visual notification for the dispatcher to engage in follow-up communication with the officer. As time continues to pass without a voice communication response being transmitted from the first communication device 200 of the officer and without the dispatcher engaging in follow-up communication (for example, because the dispatcher is busy attending to other tasks), the electronic computing device may gradually change the highlighting of officer information from yellow to orange to light red and so on. In other words, in some embodiments, the electronic computing device periodically or continuously provides an updated user interface that highlights officer information in a color-coded manner to indicate a priority of the officers in which the dispatcher should engage in follow-up communication. In some embodiments, the officer status window 310 includes an additional column that includes color-coded icons that indicate priority of the officers in which the dispatcher should engage in follow-up communication. In some embodiments, the additional column also includes a timer value that keeps track of an amount of time that has elapsed since a voice communication has been received by or transmitted from the respective first communication device 200 of each officer.

As mentioned above, the electronic computing device may determine priority based not only on an amount of time since the most recent communication with the officer, but also on the brevity code included in the most recent communication. For example, when the brevity code is 10-32 that indicates that the officer is handling an incident involving a person with a gun, the electronic computing device prioritizes the follow-up communication with this officer over follow-up communication with other officers dealing with less dangerous incidents even when the other officers have not responded for a longer amount of time.

In some embodiments, when the workload of a dispatcher is too great, the electronic computing device switches management of communication of at least one public safety officer to another dispatcher. To do so, in some embodiments, the electronic computing device determines that the dispatch console 158 of one dispatcher includes a plurality of statuses that includes an amount of high priority statuses that exceeds a predetermined threshold. The definition of "high priority status" is configurable such that it corresponds to, for example, officers who have not been communicated with for five minutes. As another example, a "high priority status" is related to the color-coded statuses mentioned above (for example, any red highlighted statuses). When the amount of high priority statuses exceeds the predetermined threshold for a given dispatch console 158 (for example, five high priority statuses), the electronic computing device determines that a workload of the dispatcher is too great and should be reduced. Accordingly, the electronic computing device removes at least one of the statuses of the plurality of statuses from the user interface 305 of the dispatch console 158 of the dispatcher. The electronic computing device displays a second user interface that includes the at least one removed status on the screen 205 of the dispatch console 158 of another dispatcher. As will be understood from FIG. 3, when switching management of communication of a public safety officer to another dispatch console 158 by removing and adding a status of the public safety officer as described above, the electronic computing device also updates other information in the officer status window 310 accordingly (for example, name of the officer and most recent communication).

Although switching management of communication of a public safety officer to another dispatch console 158 is described above as being based on an amount of high priority statuses exceeding a predetermined threshold, in some embodiments, the electronic computing device switches management of communication of a public safety officer to another dispatch console 158 based on an amount of public safety officers whose communication is being managed exceeding a predetermined threshold. For example, when the amount of public safety officers whose communication is being managed by the dispatch console 158 exceeds twenty officers, the electronic computing device switches management of communication of at least one of the public safety officers another dispatch console 158 regardless of the priority level of the statuses for each of the public safety officers.

In some embodiments, the electronic computing device provides a notification on an output device of a second dispatch console 158 in response to recognizing a brevity code in a voice communication from the first communication device 200. The second dispatch console 158 may be associated with a different public safety agency or a public safety agency in a different jurisdiction. For example, when the brevity code 10-70 (indicating a fire alarm has been triggered) is included in the voice communication from a police officer, the electronic computing device provides an updated status of the police officer on a first dispatch console 158 of a police dispatcher and provides a notification on a second dispatch console 158 of a fire station dispatcher. Providing information to multiple dispatch consoles 158 of different public safety agencies or public safety agencies in different jurisdictions allows these public safety agencies to work together in a more efficient fashion to handle public safety incidents.

In some embodiments, the electronic computing device stores a log of voice communications including brevity codes received by and transmitted from the first communication devices 200 of each public safety officer. The log is stored in the database 164 or on a memory of at least one of the dispatch console 158, the first communication device 200, and the infrastructure controller 156. In some embodiments, the log includes at least one of time and date stamps corresponding to a time at which each of the voice communications was received or transmitted, location information corresponding to a location of the first communication device 200 when each of the voice communications was received or transmitted, and a unique identifier corresponding to the first communication device 200. The log of voice communications may be used by public safety personnel to evaluate whether agency rules are being followed. For example, the log indicates whether public safety officers are responding in a timely manner for different situations and whether dispatchers are engaging in follow-up communication at appropriate times for different situations.

Figure 5:
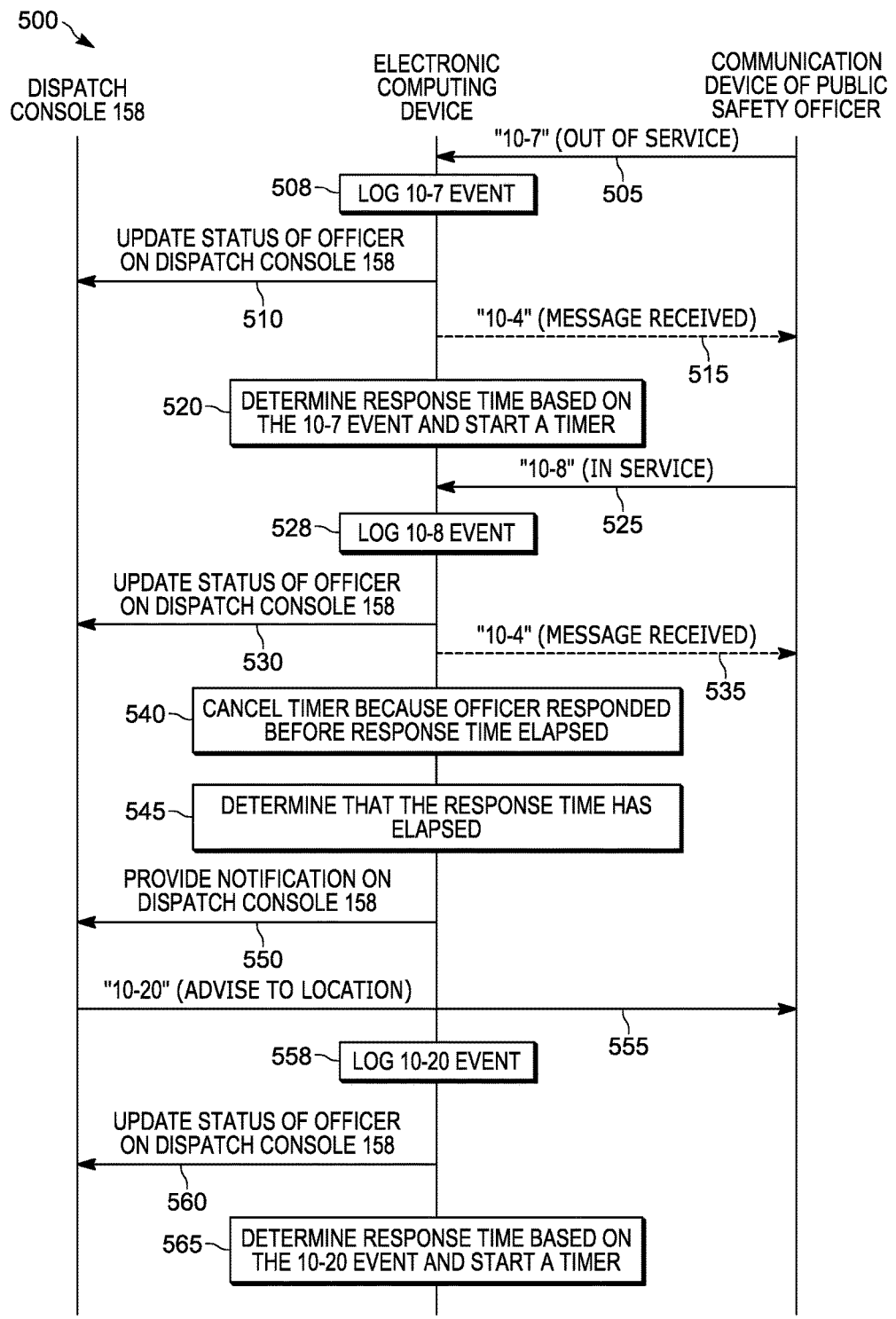
FIG. 5 illustrates a message flow diagram for an example use case where an electronic computing device executes the method of FIG. 4 in accordance with some embodiments.

FIG. 5 illustrates a message flow diagram 500 for an example use case where the electronic computing device executes the method 400 of FIG. 4. The first communication device 200 of a public safety officer in the field transmits first voice communication 505. The first voice communication 505 includes the brevity code 10-7 that indicates that the officer is going out of service or on break. The electronic computing device analyzes the first voice communication 505 (for example, using the natural language processing engine as explained above) and recognizes the brevity code 10-7. The electronic computing device then takes action 508 to log the 10-7 event and update the status of the officer on the user interface of the dispatch console 158 through communication 510 (see, for example, user interface 305 of FIG. 3). In some embodiments, the electronic computing device transmits an acknowledgement message 515 to provide a notification on an output device of the first communication device 200 indicating that the first voice communication 505 has been received by the dispatch console 158. In some embodiments, the acknowledgement message 515 is an automated message generated by the electronic computing device as a visual or audio output on the first communication device 200 (for example, the speaker 222 audibly outputting "10-4" or the screen 205 generating a text-based response that reads "10-4"). In some embodiments, the automated acknowledgement message 515 allows the dispatcher to receive information from the first communication device 200 without manually providing a voice communication that acknowledges receipt of the information. In other embodiments, the electronic computing device provides the automated acknowledgement message 515 only after receiving a user input on the dispatch console 158 from the dispatcher confirming that electronic computing device does so.

At block 520, the electronic computing device determines the response time based on the 10-7 event as explained above with respect to block 415 of FIG. 4. The electronic computing device also starts a timer to keep track of the amount of time that has elapsed since the first voice communication 505 was transmitted by the first communication device 200 of the officer. Continuing a previous example, the electronic computing device determines that an agency rule establishes that the officer's break is fifteen minutes long. Accordingly, in this example, the electronic computing device determines that the response time is fifteen minutes.

After some time elapses, the first communication device 200 transmits a second voice communication 525 that includes the brevity code 10-8 that indicates that the officer is back in service. The electronic computing device analyzes the second voice communication 525 and recognizes the brevity code 10-8. The electronic computing device then takes action 528 to log the 10-8 event and update the status of the officer on the user interface of the dispatch console 158 through communication 530. As mentioned above, in some embodiments, the electronic computing device transmits an acknowledgement message 535 to provide a notification on an output device of the first communication device 200 indicating that the second voice communication 525 has been received by the dispatch console 158. At block 540, the electronic computing device cancels the timer because the second voice communication 525 was transmitted by the first communication device 200 before the response time elapsed.

The message flow diagram 500 also shows an alternate situation for when the second voice communication 525 is not transmitted before the response time elapses. At block 545, the electronic computing device determines that the response time has elapsed and that the second voice communication 525 has not been transmitted by the first communication device 200 as explained above with respect to blocks 420 and 430 of FIG. 4. In response, the electronic computing device takes action 550 to provide a notification on at least one of the dispatch console 158 and the first communication device 200 as explained above with respect to block 435 of FIG. 4. In the example shown in FIG. 5, the electronic computing device provides a notification on the dispatch console 158.

In some situations, the dispatcher of the dispatch console 158 notices the notification and is reminded to engage, and does engage, in follow-up communication with the officer. For example, the dispatch console 158 transmits a third voice communication 555 from the dispatch console 158 to the first communication device 200. In this example, the third voice communication 555 includes the brevity code 10-20 to request the location of the officer. In other words, the brevity code 10-20 in this situation is similar to a status check of the officer. In some embodiments, the third voice communication 555 is automated by the electronic computing device such that the dispatcher does not need to manually engage in follow-up communication with the officer. In some embodiments where the electronic computing device provides an automated voice communication, the electronic computing device provides the automated voice communication only after receiving a user input on the dispatch console 158 from the dispatcher confirming that electronic computing device does so. The electronic computing device analyzes the third voice communication 555 and recognizes the brevity code 10-20. The electronic computing device then takes action 558 to log the 10-20 event and update the status of the officer on the user interface of the dispatch console 158 through communication 560.

At block 565, the electronic computing device determines another response time based on the 10-20 event and starts a timer to keep track of the amount of time that has elapsed since the third voice communication 555 was transmitted by the dispatch console 158. In some embodiments, this response time is also based on the predetermined meaning of the previous brevity code (10-7 in this example) to which the officer has not yet responded. In other words, when the third voice communication 555 is transmitted by the dispatch console 158, the electronic computing device re-executes the method 400 with respect to the third voice communication 555.

In some embodiments, the electronic computing provides automated voice communication to the first communication device 200 a predetermined number of times before providing a notification to the dispatch console 158. For example, the electronic computing device repeats an automated voice communication that includes the brevity code 10-20 to the officer three times (for example, once every minute for three minutes) before providing a notification to the dispatch console 158.

In some embodiments, the electronic computing device determines at least one expected brevity code based on the brevity code of a first voice communication. For example, for a 10-7 brevity code indicating that the officer is out of service, an expected brevity code in response is 10-8 indicating that the officer is back in service. As another example, for a 10-19 brevity code indicating that the officer return to a public safety command station, an expected brevity code in response is 10-4 indicating that the officer received the message and is proceeding back to the command station. In some embodiments, the electronic computing device provides a notification on an output device of at least one of the dispatch console 158 and the first communication device 200 in response to determining that the second voice communication does not include the at least one expected brevity code. For example, with reference to FIG. 5, when the second voice communication 525 does not include the 10-8 brevity code, the electronic computing device provides a notification on the dispatch console 158 to alert the dispatcher that an unexpected response was received. In some embodiments, the electronic computing device provides this notification regarding unexpected brevity codes regardless of whether the second voice communication is transmitted before or after the response time has elapsed.

In some embodiments, the electronic computing device is configurable, for example via a user input of the dispatch console 158, such that certain brevity codes are selected to be handled by the electronic computing device while other brevity codes are handled manually by the dispatcher. In other words, the electronic computing device provides updated statuses on the officer status window 310 and provides follow-up communication notifications for certain brevity codes but does not perform such functions for other brevity codes that are handled manually. For example, brevity codes with relatively simple predetermined meanings that typically do not include much additional information (for example, 10-7 indicating that an officer is out of service, 10-8 indicating that an officer is back in service, and the like) are configured to be handled by the electronic computing device. Continuing this example, brevity codes with more complex predetermined meanings that often include additional information (for example, 10-15 indicating that a prisoner is in custody, 10-31 indicating that there is a crime in progress, and the like) are configured to be handled manually by the dispatcher. Additionally, in some embodiments, a manual override is received via a user input on the dispatch console 158 that allows the dispatcher to manually handle communication with an officer that was previously being handled by the electronic computing device. In such a situation, the electronic computing device may still log brevity codes with time and date stamps as explained above for record-keeping purposes.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
   a transceiver; and
   an electronic processor communicatively coupled to the transceiver, the electronic processor configured to
      monitor a first voice communication received by or transmitted from a first communication device;
      determine that the first voice communication includes a brevity code having a predetermined meaning;
      determine a response time based on the predetermined meaning;
      determine that the response time has elapsed and that a second voice communication has not been transmitted from the first communication device before the response time elapsed; and
      provide a notification on an output device of at least one of the first communication device and a second communication device in response to determining that the response time has elapsed without the second voice communication being transmitted from the first communication device.

2. The electronic computing device of claim 1, wherein the electronic processor is further configured to determine the response time based on at least one of the group consisting of a fleet tendency of responding to the brevity code, an officer tendency of responding to the brevity code, an agency rule, an officer involvement in an incident, a location of the first communication device, a traffic condition, an environmental condition, and data from a sensor of the first communication device.

3. The electronic computing device of claim 1, wherein the notification is at least one of the group consisting of a visual notification output on a screen and an audible notification output by a speaker.

4. The electronic computing device of claim 1, wherein the electronic processor is configured to update a status of a public safety officer associated with the first communication device based on the brevity code on a user interface of the second communication device.

5. The electronic computing device of claim 1, wherein the electronic processor is further configured to:
   display a user interface on a screen of the second communication device that includes a plurality of statuses, wherein each status corresponds to a public safety officer associated with a respective first communication device and each status is based on a respective brevity code received by or transmitted from each of the respective first communication devices; and display an updated user interface on the screen that prioritizes the plurality of statuses based on at least one of the respective brevity code and an amount of time that has elapsed since a respective voice communication that included the respective brevity code has been received by or transmitted from the respective first communication device.

6. The electronic computing device of claim 5, wherein the electronic processor is configured to:
determine that the plurality of statuses includes an amount of high priority statuses that exceeds a predetermined threshold;
remove at least one of the statuses of the plurality of statuses from the updated user interface on the screen of the second communication device; and
display a second user interface on a second screen of a third communication device that includes the at least one of the statuses of the plurality of statuses.

7. The electronic computing device of claim 1, wherein the first voice communication is transmitted from the first communication device and the electronic processor is configured to provide a second notification on the output device of the first communication device indicating that the first voice communication has been received by the second communication device.

8. The electronic computing device of claim 1, wherein the electronic processor is further configured to:
determine at least one expected brevity code based on the brevity code of the first voice communication; and
provide a second notification on the output device of at least one of the first communication device and the second communication device in response to determining that the second voice communication does not include the at least one expected brevity code.

9. The electronic computing device of claim 1, wherein the electronic processor is configured to store, in a memory, a log of voice communications including brevity codes received by and transmitted from the first communication device, wherein the log includes at least one of the group consisting of time and date stamps corresponding to a time at which each of the voice communications was received or transmitted, location information corresponding to a location of the first communication device when each of the voice communications was received or transmitted, and a unique identifier corresponding to the first communication device.

10. The electronic computing device of claim 1, wherein the electronic processor is further configured to:
monitor a third voice communication received by or transmitted from the first communication device;
determine that the third voice communication includes a second brevity code having a second predetermined meaning different than the predetermined meaning;
determine a second response time based on the second predetermined meaning, wherein the second response time is different than the response time;
determine that the second response time has elapsed and that a fourth voice communication has not been transmitted from the first communication device before the second response time elapsed; and
provide the notification on the output device of at least one of the first communication device and the second communication device in response to determining that the second response time has elapsed without the fourth voice communication being transmitted from the first communication device.

11. A method for providing a time-adaptive notification to public safety personnel when a response to a voice communication including a brevity code is not received, the method comprising:
monitoring, with an electronic computing device, a first voice communication received by or transmitted from a first communication device;
determining, with the electronic computing device, that the first voice communication includes a brevity code having a predetermined meaning;
determining, with the electronic computing device, a response time based on the predetermined meaning;
determining, with the electronic computing device, that the response time has elapsed and that a second voice communication has not been transmitted from the first communication device before the response time elapsed; and
providing, with the electronic computing device, a notification on an output device of at least one of the first communication device and a second communication device in response to determining that the response time has elapsed without the second voice communication being transmitted from the first communication device.

12. The method of claim 11, wherein determining the response time includes determining the response time based on at least one of the group consisting of a fleet tendency of responding to the brevity code, an officer tendency of responding to the brevity code, an agency rule, an officer involvement in an incident, a location of the first communication device, a traffic condition, an environmental condition, and data from a sensor of the first communication device.

13. The method of claim 11, wherein providing the notification includes providing at least one of the group consisting of a visual notification output on a screen and an audible notification output by a speaker.

14. The method of claim 11, further comprising updating a status of a public safety officer associated with the first communication device based on the brevity code on a user interface of the second communication device.

15. The method of claim 11, further comprising:
displaying, with the electronic computing device, a user interface on a screen of the second communication device that includes a plurality of statuses, wherein each status corresponds to a public safety officer associated with a respective first communication device and each status is based on a respective brevity code received by or transmitted from each of the respective first communication devices; and
displaying, with the electronic computing device, an updated user interface on the screen that prioritizes the plurality of statuses based on at least one of the respective brevity code and an amount of time that has elapsed since a respective voice communication that included the respective brevity code has been received by or transmitted from the respective first communication device.

16. The method of claim 15, further comprising:
determining, with the electronic computing device, that the plurality of statuses includes an amount of high priority statuses that exceeds a predetermined threshold;
removing, with the electronic computing device, at least one of the statuses of the plurality of statuses from the updated user interface on the screen of the second communication device; and displaying, with the electronic computing device, a second user interface on a second screen of a third communication device that includes the at least one of the statuses of the plurality of statuses.

17. The method of claim 11, wherein monitoring the first voice communication includes monitoring the first voice communication, the first voice communication being transmitted from the first communication device and further comprising:
providing, with the electronic computing device, a second notification on the output device of the first communication device indicating that the first voice communication has been received by the second communication device.

18. The method of claim 11, further comprising:
determining, with the electronic computing device, at least one expected brevity code based on the brevity code of the first voice communication; and
providing, with the electronic computing device, a second notification on the output device of at least one of the first communication device and the second communication device in response to determining that the second voice communication does not include the at least one expected brevity code.

19. The method of claim 11, further comprising storing, with the electronic computing device in a memory, a log of voice communications including brevity codes received by and transmitted from the first communication device, the log including at least one of the group consisting of time and date stamps corresponding to a time at which each of the voice communications was received or transmitted, location information corresponding to a location of the first communication device when each of the voice communications was received or transmitted, and a unique identifier corresponding to the first communication device.

20. The method of claim 11, further comprising:
monitoring, with the electronic computing device, a third voice communication received by or transmitted from the first communication device;
determining, with the electronic computing device, that the third voice communication includes a second brevity code having a second predetermined meaning different than the predetermined meaning;
determining, with the electronic computing device, a second response time based on the second predetermined meaning, wherein the second response time is different than the response time;
determining, with the electronic computing device, that the second response time has elapsed and that a fourth voice communication has not been transmitted from the first communication device before the second response time elapsed; and
providing, with the electronic computing device, the notification on the output device of at least one of the first communication device and the second communication device in response to determining that the second response time has elapsed without the fourth voice communication being transmitted from the first communication device.

* * * * *